US011433753B2

(12) United States Patent
Stephens

(10) Patent No.: US 11,433,753 B2
(45) Date of Patent: Sep. 6, 2022

(54) VEHICLE COVER SYSTEM AND DEVICE

(71) Applicant: Alise Alixe Stephens, North Las Vegas, NV (US)

(72) Inventor: Alise Alixe Stephens, North Las Vegas, NV (US)

(*) Notice: Subject to any disclaimer, the term of this patent is extended or adjusted under 35 U.S.C. 154(b) by 0 days.

(21) Appl. No.: 17/330,208

(22) Filed: May 25, 2021

(65) Prior Publication Data

US 2021/0370753 A1    Dec. 2, 2021

Related U.S. Application Data

(60) Provisional application No. 63/029,901, filed on May 26, 2020.

(51) Int. Cl.
*B60J 11/04* (2006.01)
*B60J 11/02* (2006.01)

(52) U.S. Cl.
CPC ............ *B60J 11/04* (2013.01); *B60J 11/02* (2013.01)

(58) Field of Classification Search
CPC .................................... B60J 11/04; B60J 11/02
USPC .......................................... 296/136.11, 136.1
See application file for complete search history.

(56) References Cited

U.S. PATENT DOCUMENTS

| | | | | |
|---|---|---|---|---|
| 4,216,989 A * | 8/1980 | Tackett | ................... | B60J 11/00 150/166 |
| 7,337,793 B2 * | 3/2008 | Chen | ........................ | B60J 11/02 135/117 |
| 9,126,541 B2 * | 9/2015 | Goldstein | ................ | B60P 1/286 |
| 9,701,185 B1 * | 7/2017 | Usanga | ..................... | B60J 11/02 |
| 9,815,359 B2 * | 11/2017 | Morazan | .................. | E04H 15/06 |
| 10,654,350 B1 * | 5/2020 | Lovisetto | ................ | E04H 15/06 |
| 2018/0065456 A1 * | 3/2018 | Sun | ........................... | B60J 11/04 |
| 2020/0254862 A1 * | 8/2020 | Don | ........................... | B60J 11/04 |

FOREIGN PATENT DOCUMENTS

| | | | | | |
|---|---|---|---|---|---|
| CN | 104786797 | A | * | 7/2015 | .............. B60J 11/04 |
| CN | 205292246 | U | * | 6/2016 | |
| EP | 1889741 | A1 | * | 2/2008 | .............. B60J 11/00 |
| KR | 20200063693 | A | * | 11/2018 | .............. B60J 11/02 |
| KR | 2019053743 | A | * | 5/2019 | .............. B60J 11/02 |

OTHER PUBLICATIONS https://www.amazon.com/QXXZ-Automatic-Retractable-Anti-Theft-Protection.

* cited by examiner

*Primary Examiner* — Jason S Morrow
(74) *Attorney, Agent, or Firm* — Camille A. Wilson; Wilson Dutra, PLLC

(57) ABSTRACT

A vehicle covering device may comprise a case, a spooling mechanism, an attachment mechanism, and a cover, wherein the cover is configured to fit over a vehicle. The system may comprise a spooling mechanism with rotational deployment and retraction of a cover from a central location with sufficient momentum to extend the cover sufficient to enclose a vehicle. The cover may comprise a plurality of predetermined sizes to be used with a plurality of vehicles, either in their entirety or for designated parts. The cover may comprise a plurality of elements distributed throughout or confined to a particular portion such as magnets, thermo-regulators, ultraviolet shielding factors, and an alarm. The vehicle cover device may be activated by an external device such as a remote-control or a software application.

20 Claims, 14 Drawing Sheets

100

120

100

125

105

200

200

200

200

300

300

950

951

1060

1061

1062

VEHICLE COVER SYSTEM AND DEVICE

CROSS-REFERENCE TO RELATED APPLICATION

This application claims priority to and the full benefit of U.S. Provisional Patent Application Ser. No. 63/029,901, filed May 26, 2020, and titled "Electronic/Sensor Activated Car Cover", the entire contents of which are incorporated in this application by reference.

BACKGROUND

Cars help people get from one place to another, whether for a quick five-minute drive or a cross-country trek. Perhaps one of the biggest investments any person will make in their lifetime, cars are expensive and require regular maintenance to keep them running in top shape. Classic cars are a particular subset of automobiles that people tend to acquire later in life. These vehicles might require even more attention from their owners, as their vintage features are equally as charming as they are demanding.

When not using a beloved vehicle—classic or otherwise—they are stored, either in a garage or parked outside on a driveway or side of a street. There are clear advantages to storing vehicles in a garage: protection from the elements, protection from potential bad actors, and overall preservation of the vehicles that help us get to every point B from every point A. Many times, though, a garage is not an option.

The current solution is a car cover, typically made of some kind of fabric that a user can drape over their vehicle. While there are plenty of car covers on the market, they all share certain things in common: they are cumbersome, they are unreliable, and they take time to use. Most car covers are hard to store, either because they never seem to fold up just right or they are too bulky to keep in the car when not in use.

Manual application is often tricky since even smaller cars are often taller and wider than their owners. Some car covers have no way of adhering to the vehicle; others might have a sinch-tie around their base or can be fastened by running a line under the car. Most car covers are susceptible to strong winds. Many classic car owners are at least 50 years old, and fastening the cover in the ways available on the market today might be difficult and even debilitating. Furthermore, their removable nature, although necessary to drive the vehicle, puts the vehicle at risk of being burglarized or vandalized if a bad actor simply removed the cover.

These covering problems are not just unique to cars. Owners of boats, motorcycles, and other automotive means of transportation often face similar challenges in covering and protecting their vehicles. Even larger modes of transportation, such as airplanes, could benefit from better covering solutions, such as for wing protection during the winter.

SUMMARY OF THE DISCLOSURE

Accordingly, there is a need for a more efficient, non-labor intensive, and more reliable vehicle cover: one that can be used and stored with ease. A cover that not only protects a vehicle from the elements, but also could regulate its temperature, adequately shield it from damaging ultraviolet radiation, and add an additional level of security.

The present invention relates to a vehicle cover system and device comprising a case, a spooling mechanism, and a cover. In the representative embodiments, a vehicle cover is connected to a spooling mechanism. The vehicle cover system and device may also comprise an attachment mechanism to secure the vehicle cover system and device to the vehicle. The various embodiments are designed for a vehicle cover to be deployed from a case when a spooling mechanism is activated. The vehicle cover may comprise a flexible material that may include non-limiting elements such as magnets or thermoregulating components that aid in securing the vehicle cover to the vehicle and regulating the temperature of the vehicle, respectively.

In some embodiments, the vehicle cover may comprise an alarm element that alerts the owner of the vehicle when the vehicle cover is removed, such as in the case of inclement weather, attempted burglary, or vandalization, among other reasons. In various implementations, using the vehicle cover to cover a vehicle may not require manual labor other than activating the spooling mechanism using nonlimiting mechanisms such as a remote-control or a smart phone application. Therefore, the representative embodiments provide for a vehicle cover system and device that may be easy to use and store, reliably protects a vehicle from the elements, and offers enhanced vehicle security when deployed.

In some embodiments, the present invention comprises a vehicle cover device; an attachment mechanism; a cover; and an external device. In some implementations, the vehicle cover device may comprise a spooling mechanism that is activated by the external device. When activated, the cover may be engaged and the spooling mechanism may propel the cover so that it covers the vehicle. In some aspects, the external device may be used to retract the cover, disengaging the cover and storing it back within the vehicle cover device. In this embodiment, the vehicle cover device is removable from the vehicle via the attachment mechanism.

In some embodiments, the cover may comprise elements that aid in securing it to the vehicle, such as magnets or other adhesive mechanisms. In some implementations, these elements may be distributed throughout the cover or located only in parts, such as the part of the cover that aligns with the bottom portion of the vehicle.

In some embodiments, the cover may comprise elements that aid in thermoregulation or vehicle security, though these examples are not limiting, these elements may be distributed throughout the cover or located only in portion, such as the portion of the cover that aligns with the bottom portion of the vehicle. In some implementations, these elements may be controlled by an external device, such as a remote control or a smartphone application.

The present disclosure relates to a vehicle cover device includes a cover configured to fit over a vehicle; a spooling mechanism configured to spool the cover; a release mechanism may comprise an opening for rotational deployment of the cover via the spooling mechanism; an attachment mechanism configured to attach to a surface of the vehicle; and a case configured to contain one or more the spooling mechanism, the release mechanism, the cover, and the attachment mechanism.

In some embodiments, the cover may comprise magnetic or electromagnetic inseams. In some implementations, the cover may comprise a weighted base hem. In some aspects, the attachment mechanism may comprise an alignment indicator for centering the vehicle cover device on the vehicle for deployment. In some embodiments, the cover may comprise a thermoregulator element. In some implementations, the cover may comprise an alarm. In some aspects, the case may completely enclose the vehicle cover device.

In some embodiments, the attachment mechanism may extend beyond at least a portion of windows of the vehicle, where the portion of windows secures the attachment mechanism to the vehicle when the portion of windows are in a closed position. In some implementations, the spooling mechanism may be reversible, where reversing the spooling mechanism retracts the cover. In some aspects, deployment of one or both the release mechanism and the spooling mechanism may be mechanical. In some embodiments, the attachment mechanism may comprise a magnetic portion configured to attach to the vehicle.

In some implementations, deployment of one or both the release mechanism and the spooling mechanism may be electronic. In some aspects, activation of the vehicle cover device may be received through the wireless controller from an external device. In some embodiments, the external device may comprise a software application with a plurality of user interfaces to control one or more the release mechanism, the cover, the spooling mechanism, the attachment mechanism, or the case.

In some implementations, the external device may comprise a remote controller. In some aspects, the handle may be configured to accept a hand of a user. In some embodiments, the handle may comprise the release mechanism. In some implementations, one or both deployment and retraction of the cover may be manual, and where the handle controls the spooling mechanism. In some aspects, the handle may be configured to release the attachment mechanism. In some embodiments, the attachment mechanism may comprise suction cups. Implementations of the described techniques may comprise hardware, a method or process, or computer software on a computer-accessible medium.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

The present disclosure provides generally for a vehicle cover system and device. According to the present disclosure, the vehicle cover system may provide a method of deploying a cover via the vehicle cover device that secures the cover to the vehicle autonomously. In some embodiments, the cover may comprise a plurality of elements that may assist in maintaining the preserved condition of the vehicle. The vehicle cover device may allow condensed storage and a portable nature to a cover.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Vehicle: as used herein refers to a form of transportation such as, but not limited to, a car, truck, bus, plane, motorcycle, boat, train, and other non-limiting modes of transportation. A vehicle may comprise modes of transportation for commute as well as for recreation. A vehicle may comprise an object that comprises a top surface and a body or frame that may be enclosed by a cover.

Figure 1A:
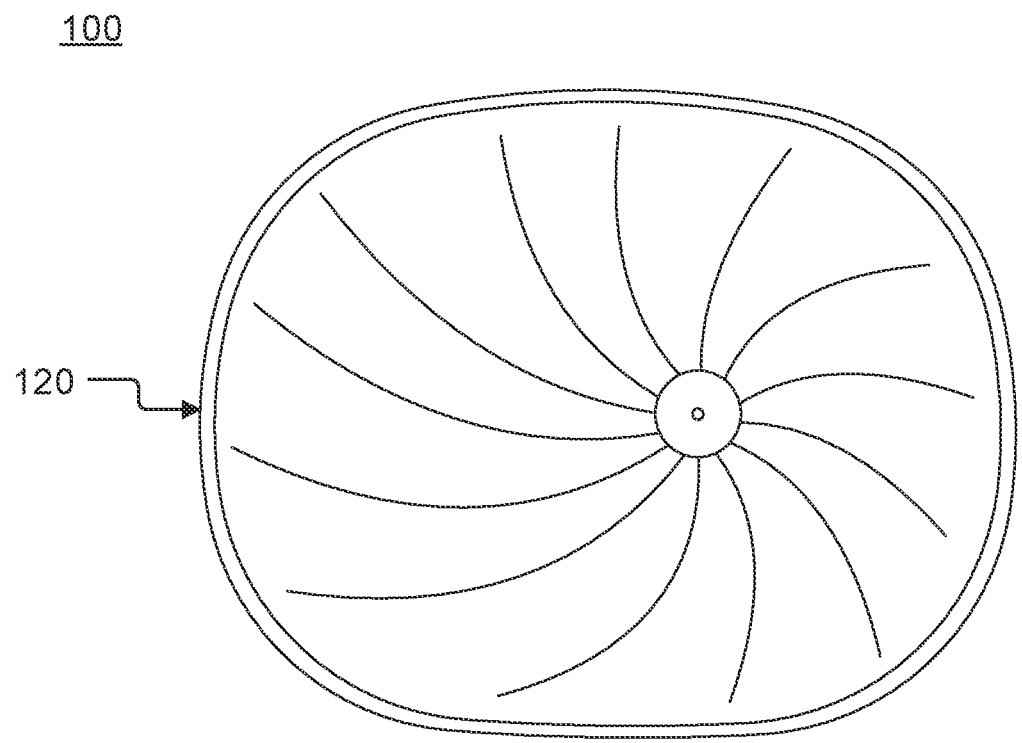
FIG. 1A illustrates an exemplary vehicle cover device, according to some embodiments in the present disclosure.
Figure 1B:
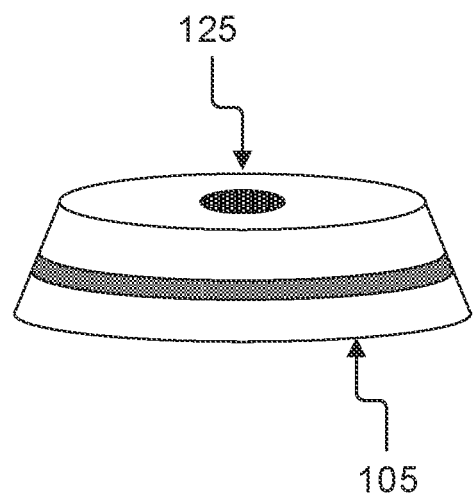
FIG. 1B illustrates an exemplary vehicle cover device, according to some embodiments in the present disclosure.
Figure 2A:
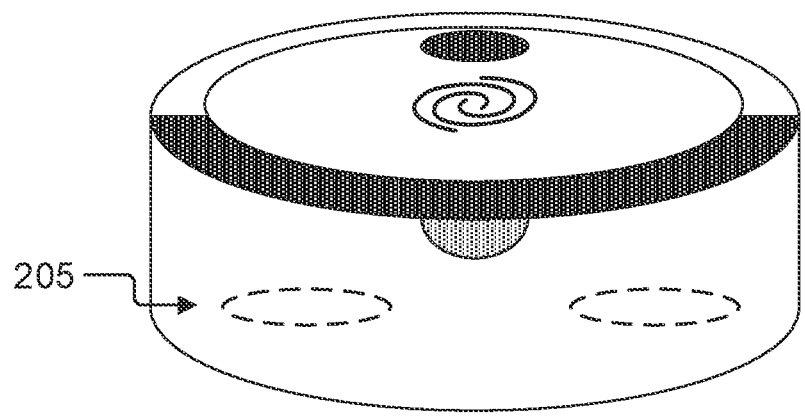
FIG. 2A illustrates a case of an exemplary vehicle cover device, according to some embodiments in the present disclosure.
Figure 2B:
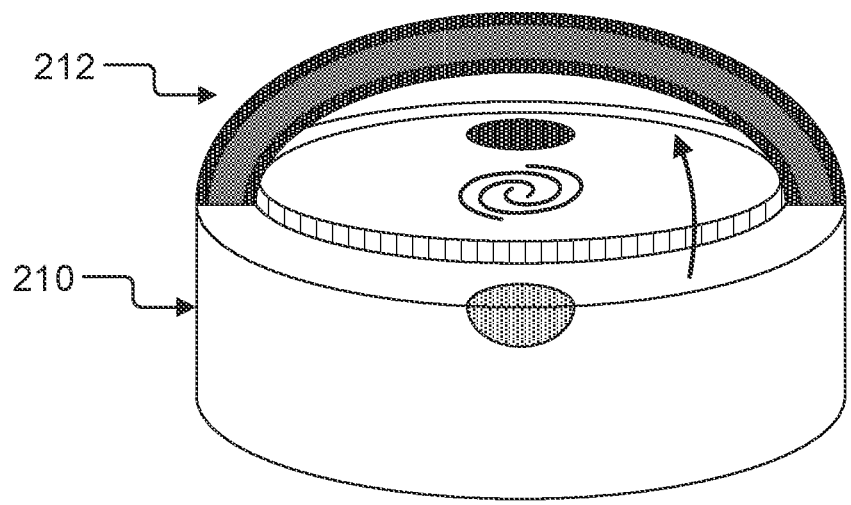
FIG. 2B illustrates a case of an exemplary vehicle cover device, according to some embodiments in the present disclosure.
Figure 2C:
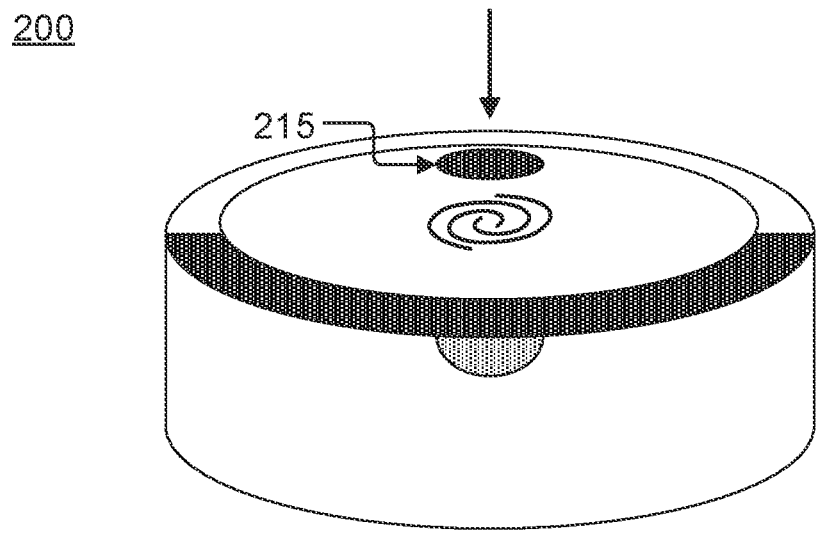
FIG. 2C illustrates a case of an exemplary vehicle cover device, according to some embodiments in the present disclosure.
Figure 2D:
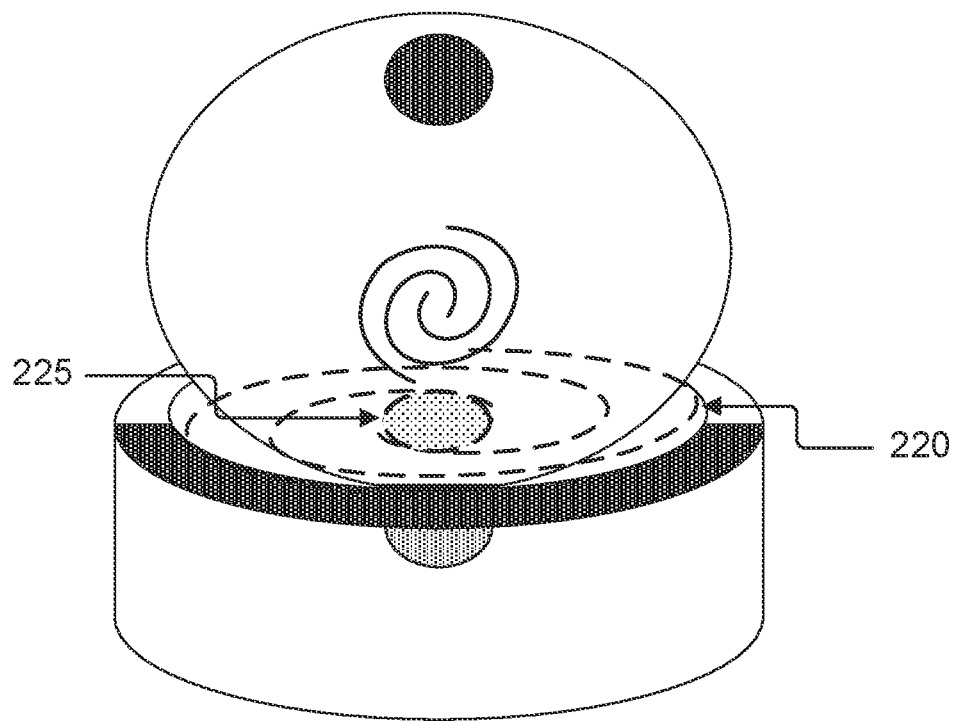
FIG. 2D illustrates a case of an exemplary vehicle cover device, according to some embodiments in the present disclosure.

Referring now to FIGS. 1A-B, an exemplary vehicle cover device 100 is illustrated. In some embodiments, the vehicle cover device 100 may comprise an attachment mechanism 105 to secure the vehicle cover device 100 to a vehicle. In some implementations, the vehicle cover device 100 may comprise a cover 120.

In some aspects, the vehicle cover device 100 may comprise a spooling mechanism 125 that may spool the cover 120 when stored. When the vehicle cover device 100 is deployed, the spooling mechanism 125 may rotate the cover 120 over a vehicle. In some implementations, the spooling mechanism 125 may use centrifugal force to spin the cover 120 out into position over the vehicle. During retraction, the spooling mechanism 125 may rotate to respool the cover 120.

In some embodiments, the spooling mechanism 125 may be mechanically activated. In some aspects, the spooling mechanism 125 may be electronic. For example, the attachment mechanism 105 may be magnetic or comprise an adhesive material that allows the vehicle cover device 100 to be easily attached to and removed from the vehicle. The cover 120 may comprise of a light-weight, flexible material such as a polymer, plastic, coated canvas, or polyester, as non-limiting examples. In some embodiments, the cover 120 may comprise adhesion elements such as magnets throughout the cover 120 or limited to certain areas of the cover 120. In some embodiments, the cover 120 may comprise thermoregulating or ultraviolet shielding elements, as non-limiting examples.

Referring now to FIGS. 2A-D, a case 210 of an exemplary vehicle cover device 200 is illustrated. In some embodiments, the vehicle cover device may comprise a case 210 to retain the vehicle cover device 200. In some aspects, the case 210 may comprise portions of the vehicle cover device 200.

As an example, the outer side wall of the vehicle cover device 200 may comprise a material that functions as a protective case 210 for the vehicle cover device 200. Similarly, a collapsible handle may protrude from the top of the vehicle cover device 200 as part of the case 210. The top of the vehicle cover device 200 may comprise a release mechanism 215 that may activate deployment of the cover from the vehicle cover device 200.

In some embodiments, the case 210 may be separate from the vehicle cover device 200. In some implementations, the case 210 may comprise a release mechanism 215. As another example, the vehicle cover device 200 may reside within the case 210 until intended use. The case 210 may improve portability and component retention, thereby reducing the required area to store the vehicle cover device 200. The lid of the case 210 may pivot to a vertical orientation to release the cover 220 for use. In some aspects, the release mechanism may open the case 210 through a torsion-locking mechanism, a magnetic locking mechanism, or a physical lock, as non-limiting examples.

In some implementations, the vehicle cover device 200 may comprise a handle 212. In some aspects, the handle may accept a hand of a user. In some embodiments, the handle 212 may be attached to the case. In some implementations, the handle 212 may comprise a release mechanism 215. In some embodiments, one or both deployment and retraction of the cover 220 may be manual. The handle 212 may control the spooling mechanism 225. For example, the handle 212 may be rotated to rotate the spooling mechanism 225.

In some embodiments, a handle 212 may control or aid an attachment mechanism 205 that may secure the vehicle cover device 200 to a vehicle. For example, the attachment mechanism 205 may comprise suction cups that may be released by a handle 212. As another example, the attachment mechanism 205 may comprise magnets, and the handle 212 may control placement of the attachment mechanism 205 onto the vehicle to limit damage to the vehicle.

Figure 3A:
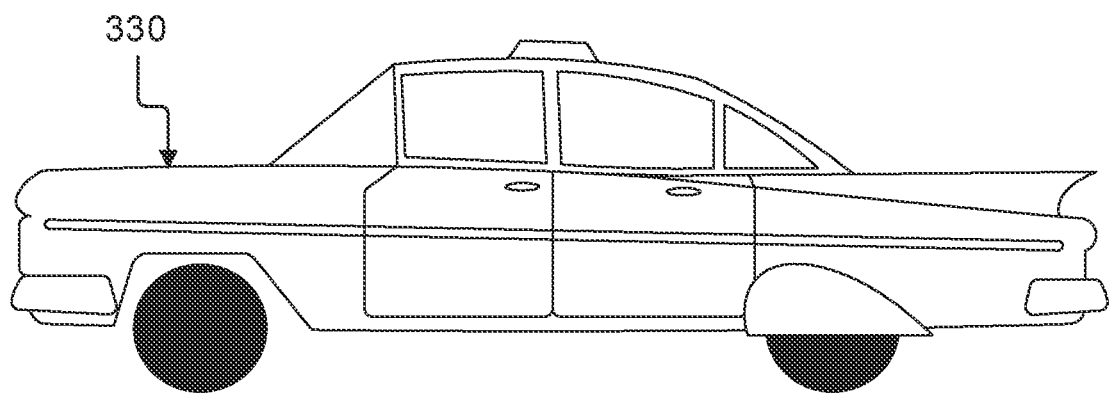
FIG. 3A illustrates an exemplary vehicle cover device, according to some embodiments in the present disclosure.
Figure 3B:
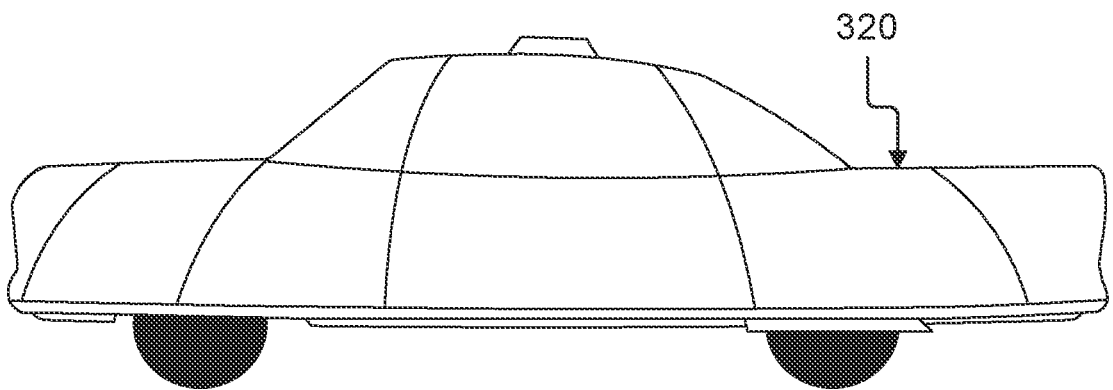
FIG. 3B illustrates an exemplary vehicle cover device, according to some embodiments in the present disclosure.

Referring now to FIGS. 3A-B, an exemplary vehicle cover device 300 is illustrated. In some embodiments, the vehicle cover device 300 may comprise an attachment mechanism to secure the vehicle cover device 300 to a vehicle 330. In some implementations, the vehicle cover device 300 may comprise a cover 320.

For example, the vehicle cover device 300 may comprise a magnetic attachment mechanism to secure the vehicle cover device 300 to a vehicle 330. In various embodiments, the vehicle cover device 300 may be removable from the vehicle 330. The vehicle cover device 300 may comprise an instruction guide or markers that would allow for proper placement on the vehicle 330. The placement of the vehicle cover device 300 may be critical to ensuring the cover 320 distributes properly across the entire vehicle 330.

In some embodiments, the vehicle cover device 300 may comprise electrical components that may assist with alignment of the vehicle cover device 300 on the vehicle 330. As an example, the vehicle cover device 300 may comprise led lights that emit from the sides of the vehicle cover device 300 that provide a measurement outline for ensuring the vehicle cover device 300 is centered on the top of the vehicle 330.

The vehicle cover device 300 may require placement at the top of the vehicle to ensure the cover 320 is rotated to a full extension without the obstruction of a taller portion of the vehicle. In some implementations, the top of the vehicle cover device 300 may open to allow a telescoping rod comprising the spooling mechanism 325 and the attached cover 320 to extend above the vehicle 330.

In some aspects, the cover 320 may comprise a light-weight, flexible material such as a polymer, plastic, coated canvas, or polyester, as non-limiting examples. In some implementations, the cover 320 may comprise a weatherproof material that may protect the vehicle 330 from the elements. In some aspects, the cover 320 may comprise magnetic wire threads that may secure the cover to the vehicle 330 throughout with a larger magnetic strip hem to anchor the cover 320 to the vehicle 330. In some embodiments, the cover 320 might include adhesion elements such as magnets throughout the cover 320 or limited to certain areas of the cover 320. In some aspects, the cover 320 may comprise thermoregulating or ultraviolet shielding elements, as non-limiting examples.

Figure 4:
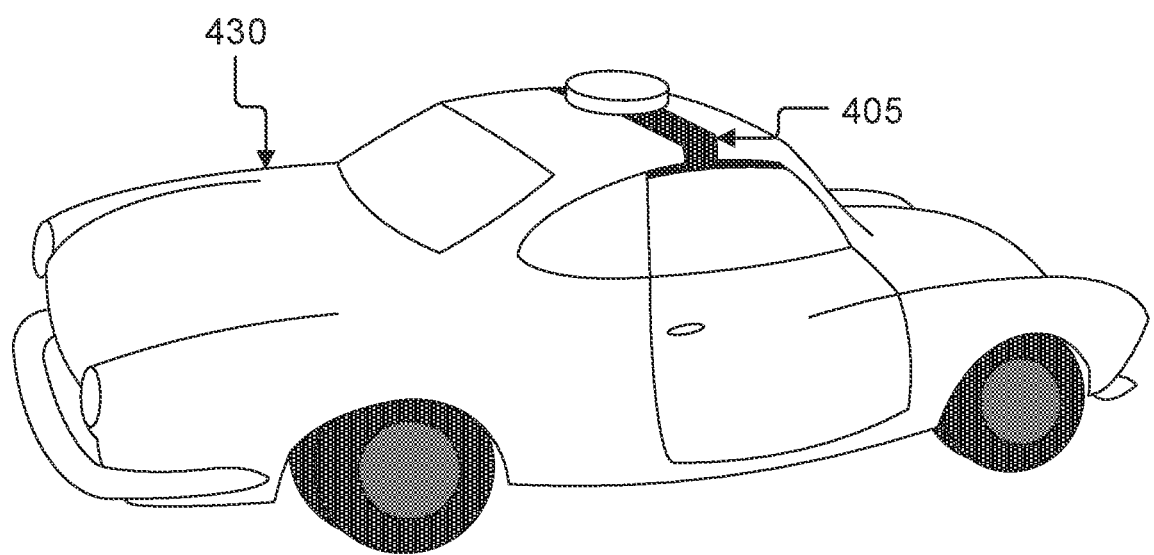
FIG. 4 illustrates an exemplary vehicle cover device, according to some embodiments in the present disclosure.

Referring now to FIG. 4, an exemplary vehicle cover device 400 is illustrated. In some embodiments, the vehicle cover device 400 may comprise an attachment mechanism 405 to secure the vehicle cover device 400 to a vehicle 430. In some implementations, the vehicle cover device 400 may comprise a cover configured to fit over a vehicle.

In some aspects, the attachment mechanism 405 may secure the vehicle cover device 400 to the vehicle 430 via flexible, fibrous straps that could be secured between top portion and windows of the vehicle 430. In some embodiments, the attachment mechanism 405 may comprise a hard plastic or similar material so the attachment mechanism 405 may be secured between a window and an upper window seam of the vehicle 430. In some implementations, the attachment mechanism 405 may distribute the weight of the vehicle cover device 400 over a larger surface area than inherent to the vehicle cover device 400, so as to be complementary to vehicles having soft-top roofs.

In some aspects, the vehicle cover device 400 may comprise a sensor that detects density beneath the vehicle cover device 400. As an illustrative example, the sensor may allow the vehicle cover device 400 to avoid creating wear on convertible car tops where a concentrated weight may create sag in the top material. The sensor may emit an audible indication when the vehicle cover device 400 is above a supporting bar within the frame of a convertible or soft-top of a vehicle 430. In some embodiments, the width of the vehicle cover device 400 may be sufficient to span the distance between supporting bars within the frame of a soft-top vehicle 430.

Figure 5A:
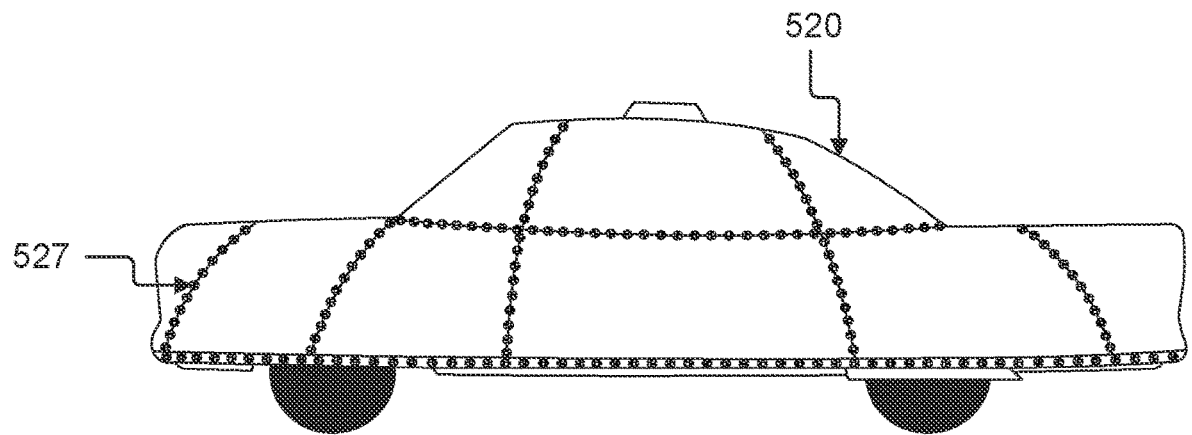
FIG. 5A illustrates an exemplary vehicle cover device comprising magnets, according to some embodiments in the present disclosure.
Figure 5B:
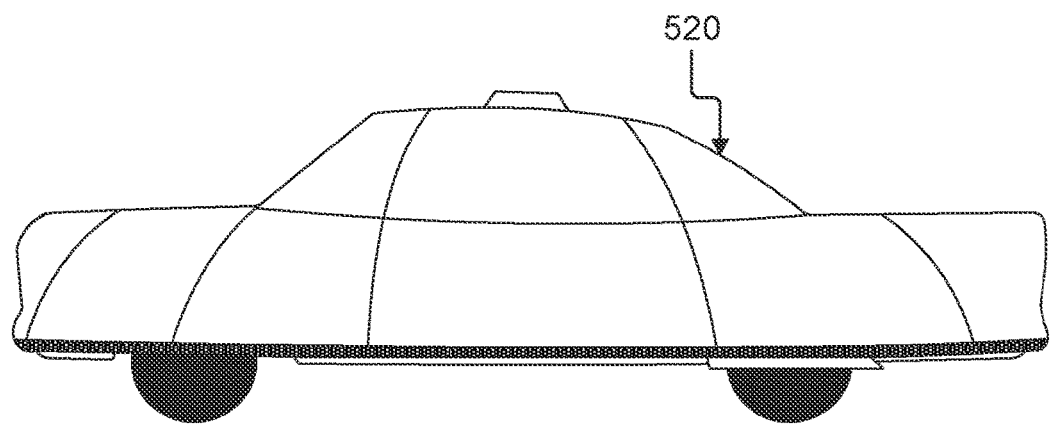
FIG. 5B illustrates an exemplary vehicle cover device, according to some embodiments in the present disclosure.

Referring now to FIGS. 5A-B, an exemplary vehicle cover device 500 comprising magnets 527 is illustrated. In some embodiments, the vehicle cover device 500 may comprise an attachment mechanism to secure the vehicle cover device 500 to a vehicle. In some implementations, the vehicle cover device 500 may comprise a cover 520. In some aspects, the cover 520 may comprise magnets 527 that assist the attachment mechanism in securing the cover 520 to the vehicle.

For example, the magnets 527 may be dispersed throughout the cover 520 to aid in securing and aligning the cover 520 to the contours of the vehicle. The magnets 527 may be dispersed throughout the cover 520 in lateral or longitudinal fibrous arrangements or in clusters, though these are non-limiting examples. For example, the cover 520 may comprise clusters of magnets 527 in regions of the cover 520 that have a higher probability of coming in contact with a magnetic surface, such as the lug nuts of a wheel or the undercarriage located at the base of the sides of the vehicle.

As an illustrative example, the inseams of the cover 520 may comprise a magnetic material. The inseams may be electromagnetic to allow the cover 520 to rotate freely as it is extending from the vehicle cover device 500 until the cover 520 is fully extended. The magnets 527 may activate via user activation or automatically after the cover 520 is fully extended.

In some embodiments, the magnets 527 may be limited to a portion of the cover 520, such as along the hem or in predetermined regions of the cover 520. Depending on the make and model vehicle, the cover 520 may be customized to include magnets 527 could align with the magnetic features of the vehicle when in use.

In some implementations, the cover 520 may comprise a weighted portion to ensure the cover 520 remains fixed with non-ferrous vehicle bodies. As an example, the bottom hem of the cover 520 may comprise a weighted material. The weight may allow the spooling mechanism to more effectively extend the cover 520 through rotation by utilized the inertia produced by the added weight. This extension may reduce the required effort of a user to cover a vehicle that comprises a non-ferrous composite exterior.

Figure 6A:
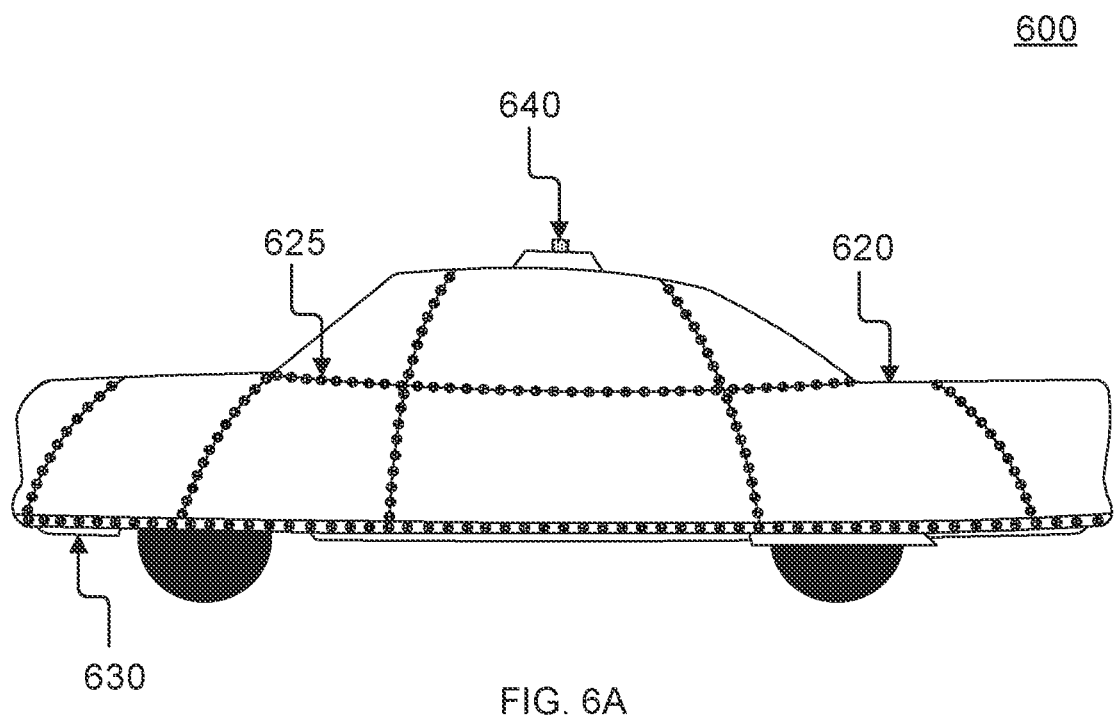
FIG. 6A illustrates an exemplary vehicle cover device comprising an alarm, according to some embodiments in the present disclosure.
Figure 6B:
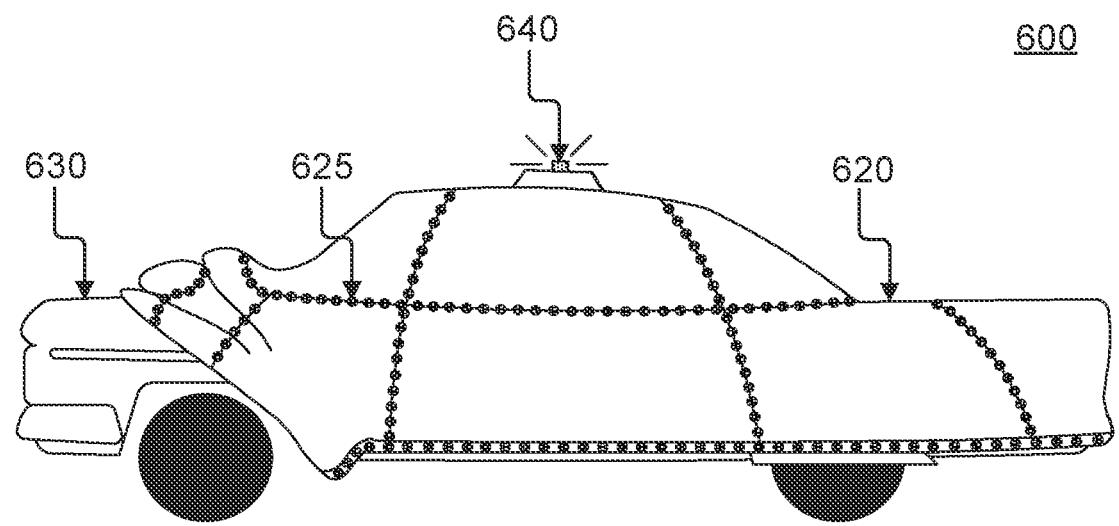
FIG. 6B illustrates an exemplary vehicle cover device comprising an alarm, according to some embodiments in the present disclosure.

Referring now to FIGS. 6A-B, an exemplary vehicle cover device comprising an alarm is illustrated. In some embodiments, the vehicle cover device 600 may comprise an attachment mechanism to secure the vehicle cover device 600 to a vehicle 630. In some implementations, the vehicle cover device 600 may comprise a cover 620. In some aspects, the cover 620 may comprise magnets 625 that assist the attachment mechanism in securing the cover 620 to the vehicle.

In some embodiments, the cover 620 may comprise an alarm 640. For example, the magnets 625 could be evenly or selectively distributed throughout the cover 620. In some embodiments, the alarm 640 might be evenly or selectively distributed beside or between the magnets 625, or confined to a particular area of the cover 620, such as the portion that aligns to the bottom of the vehicle 630.

In some embodiments, the alarm 640 may be connected to the magnets 625. As an illustrative example, the alarm may be integrated into the electrical circuit that activates the magnets 625 after the cover 620 is deployed. The electromagnetic circuit may comprise a component that detects when the cover is magnetically attached to the vehicle. The circuit may relay a notification to the alarm 640 if the connection between the vehicle and the cover is severed before the alarm 640 is disarmed. As an illustrative example, a sensor alarm may comprise a powered, thermal, or photodiode sensor that may transmit a notification if the cover 620 is lifted a predefined distance away from the vehicle.

In some embodiments, the alarm 640 may be automatically activated when the cover 620 is in use or manually activated and disengaged via a remote-control switch or smartphone application, as non-limiting examples. When triggered, the alarm 640 may provide an audio output, visual display, or both. In some aspects, the alarm 640 may comprise other notifying elements, such as transmitting a smartphone notification.

Figure 7A:
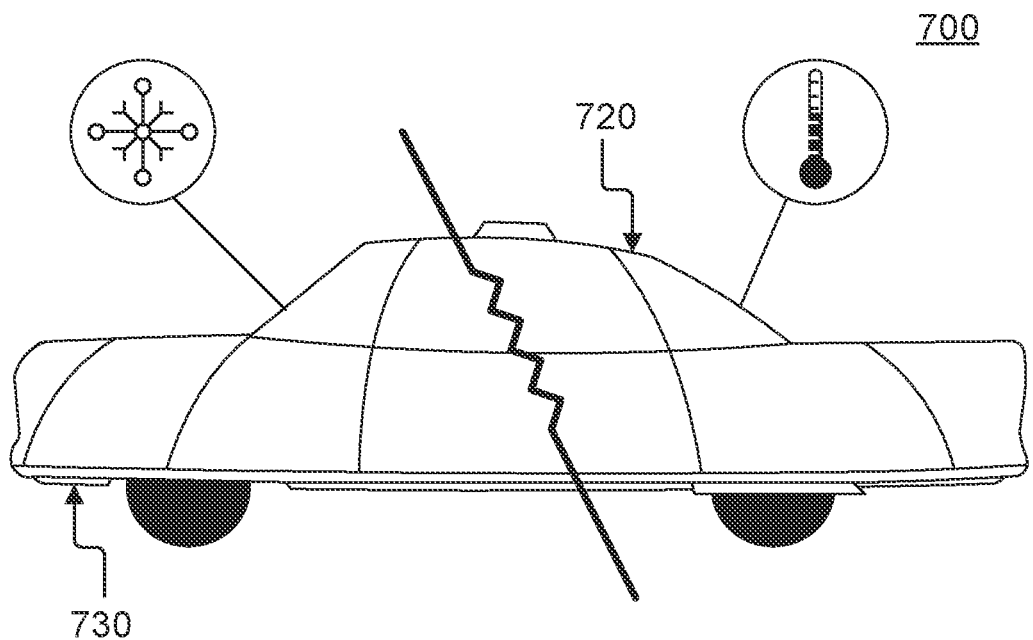
FIG. 7A illustrates an exemplary vehicle cover device, according to some embodiments in the present disclosure.
Figure 7B:
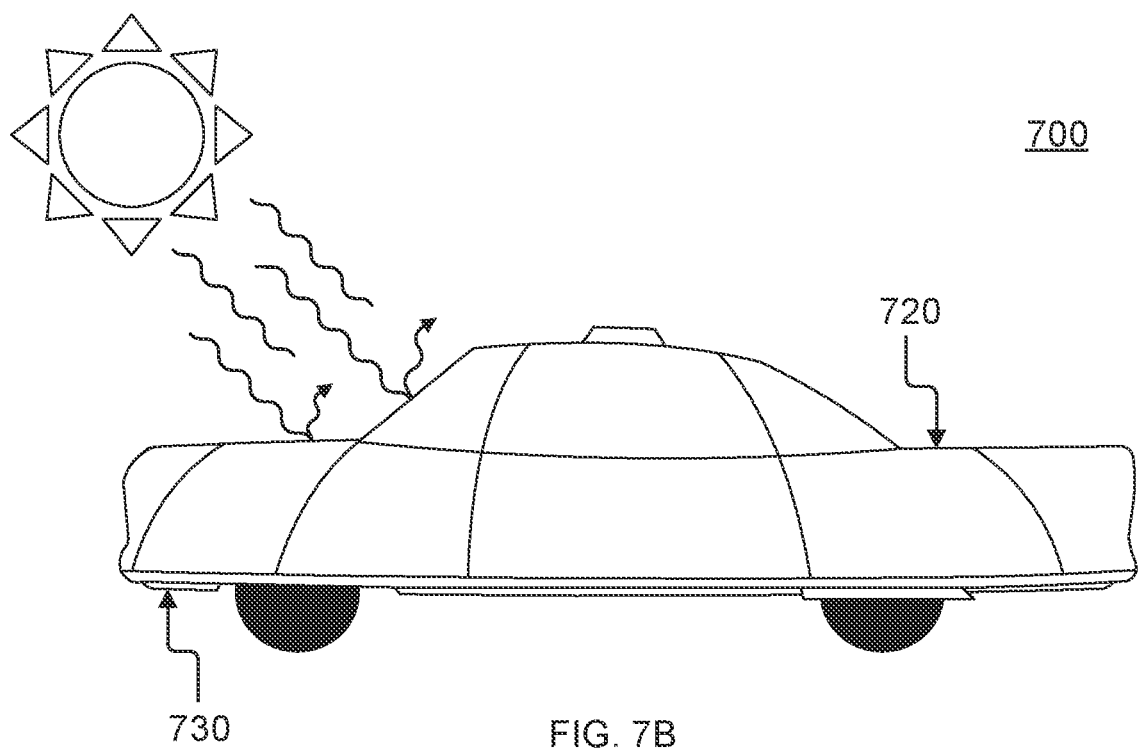
FIG. 7B illustrates an exemplary vehicle cover device, according to some embodiments in the present disclosure.

Referring now to FIGS. 7A-B, an exemplary vehicle cover device 700 is illustrated. In some implementations, the vehicle cover device 700 may comprise a cover 720. In some aspects, the cover 720 may comprise thermoregulation that may alter the temperature of the vehicle 730.

In some embodiments, the cover 720 may comprise a heating element that may perform operations such as defrosting, thawing, and melting of covered snow, as non-limiting options. As an example, a cover may collect snow as a car is parked overnight. The user may activate the heating element to melt the snow, in preparation for driving the car. In some implementations, the cover 720 may comprise a cooling element for hot climates. As another example, a car may be stored outside in a desert and the user may activate a cooling mechanism to prepare the car for driving in the middle of the day.

In some embodiments, the cover 720 may comprise an ultraviolet radiation shielding element to protect the vehicle 730 from the effects of the sun. Thermoregulation and radiation protection may improve the ability of the cover 720 to provide comprehensive protection to the vehicle 730.

Referring now to FIGS. 8A-C and 8E, an exemplary vehicle cover device 800, 801, 802, 804 is illustrated. In some implementations, the vehicle cover device 800 may comprise a cover 820. In some aspects, the cover 820 may exist in a plurality of sizes that allow the cover 820, 821, 822, 823, 824, 825, 826 to enclose a plurality of vehicles 830, 831, 832, 833, 834. The plurality of covers 820, 821, 822, 823, 824, 825, 826 may allow the vehicle cover device to cover vehicles of a plurality of sizes such as an airplane, an SUV, a pickup truck, or a sedan, as a non-limiting list of examples.

Figure 8A:
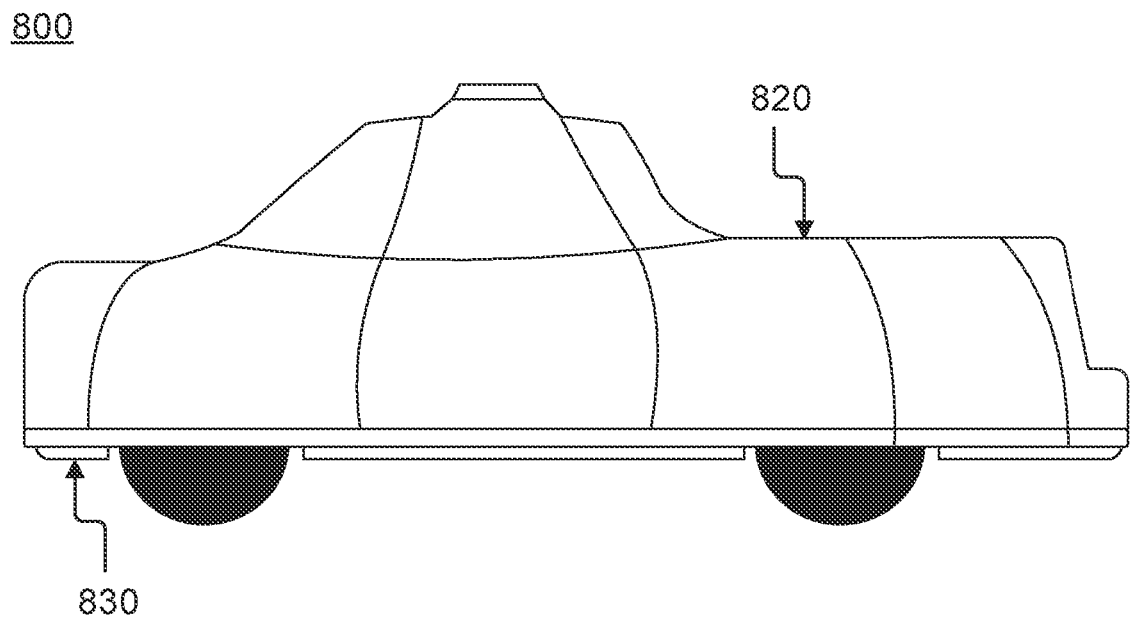
FIG. 8A illustrates an exemplary vehicle cover device, according to some embodiments in the present disclosure.
Figure 8B:
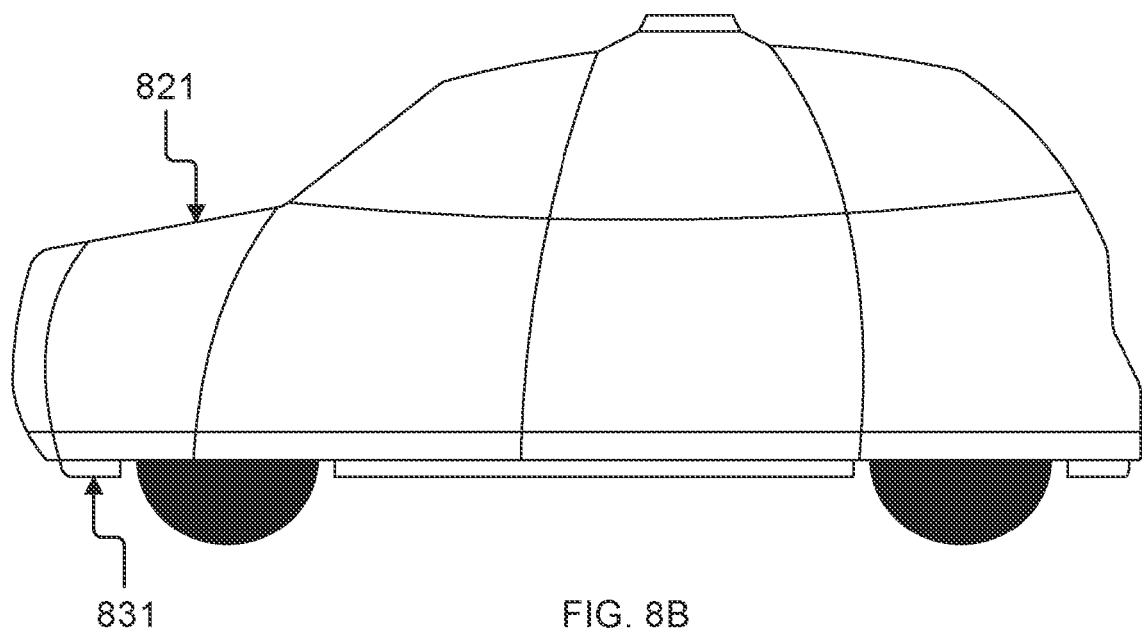
FIG. 8B illustrates an exemplary vehicle cover device, according to some embodiments in the present disclosure.
Figure 8C:
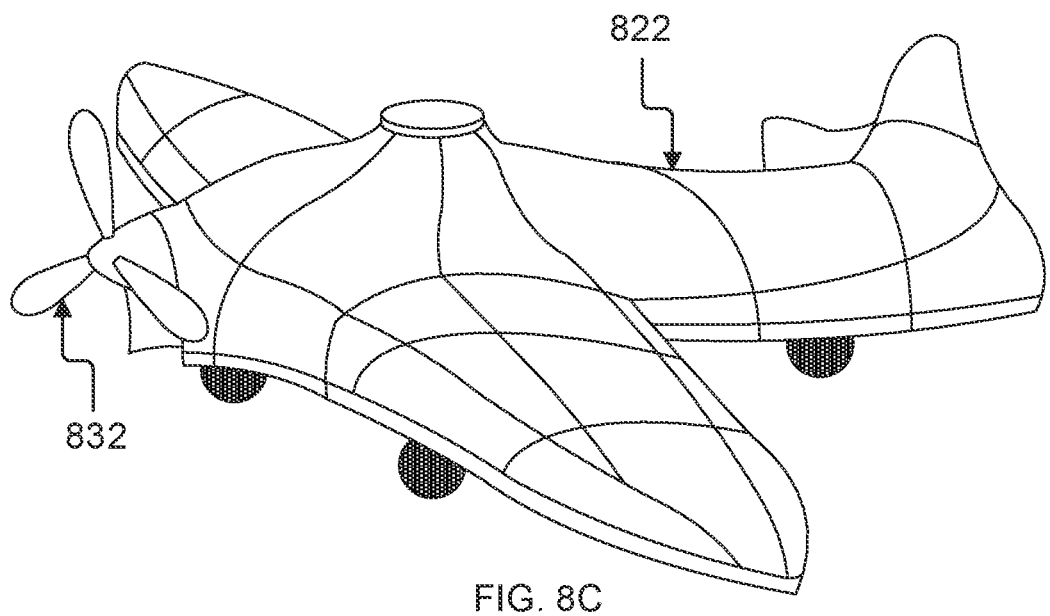
FIG. 8C illustrates an exemplary vehicle cover device, according to some embodiments in the present disclosure.
Figure 8D:
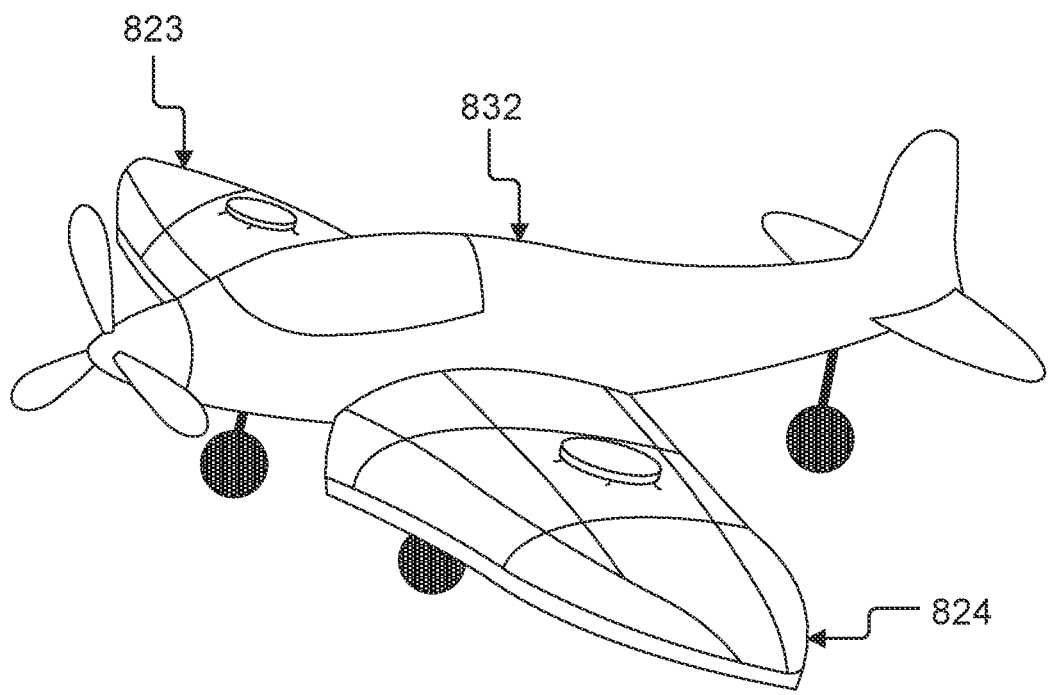
FIG. 8D illustrates a plurality of exemplary vehicle cover devices, according to some embodiments in the present disclosure.
Figure 8E:
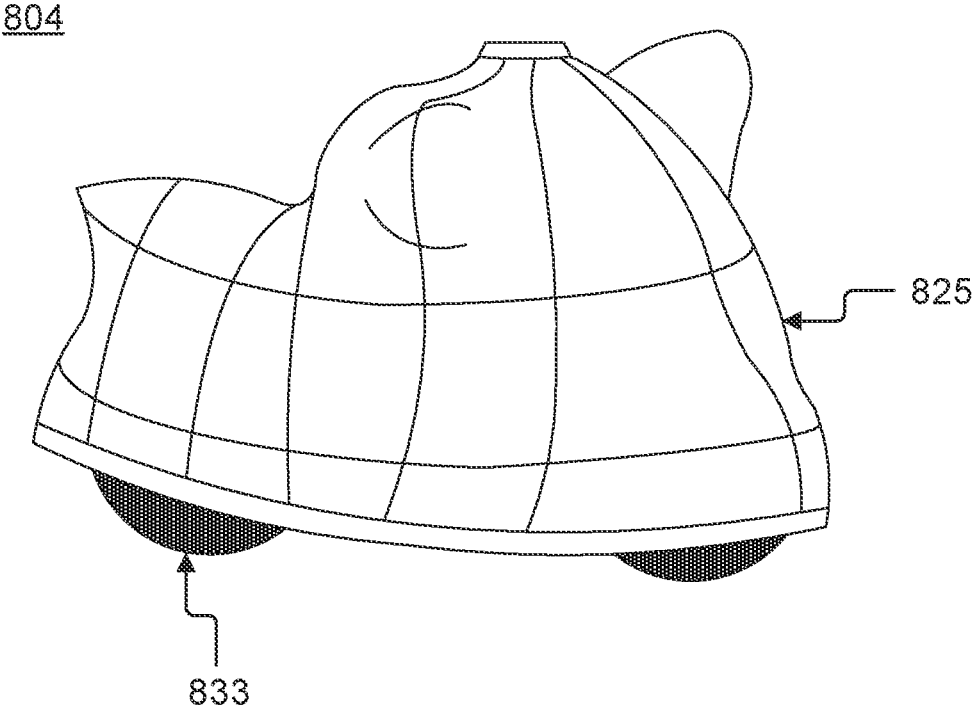
FIG. 8E illustrates an exemplary vehicle cover device, according to some embodiments in the present disclosure.
Figure 8F:
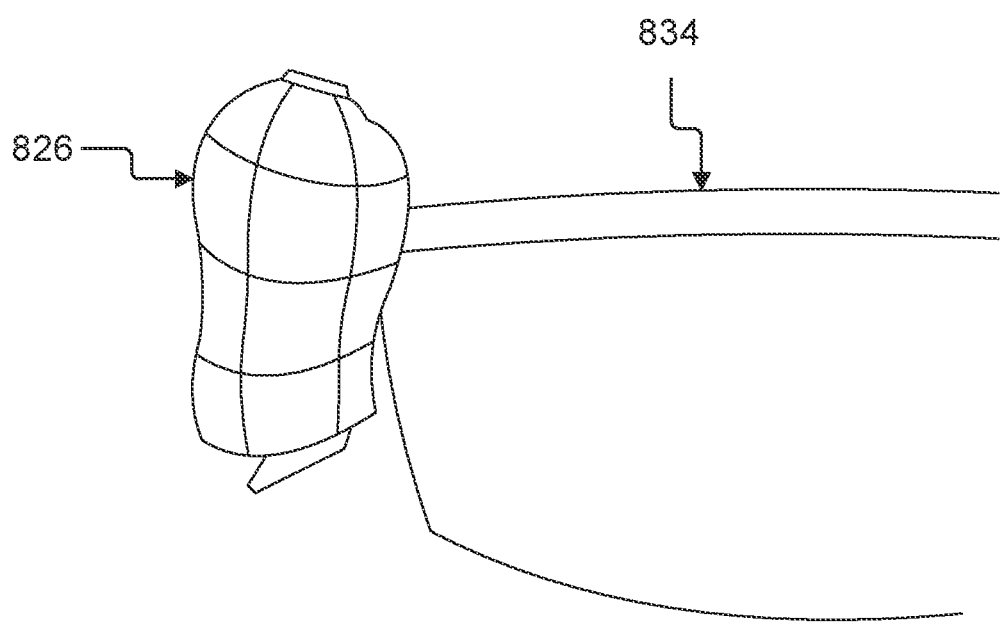
FIG. 8F illustrates an exemplary vehicle cover device, according to some embodiments in the present disclosure.

Referring now to FIGS. 8D and 8F, a plurality of exemplary vehicle cover devices 803, 805 is illustrated. In some embodiments, a vehicle cover device 803 may comprise two or more covers 823, 824. In some aspects, the plurality of covers 823, 824 may enable focused application purposes. As an illustrative example, a plane may utilize two vehicle cover devices to prevent the wings from freezing during cold weather and defrosting the wings when applicable. The covers 823, 824 may comprise a heating element that may activate upon demand.

In some implementations, a vehicle cover device may comprise a cover 826 that encloses a portion of the vehicle 834. As an example, the cover 826 may be used to keep a boat engine warm after the boat has been winterized for the winter. The cover 826 may provide heat to the engine via the cover 826 while allowing non-critical parts to remain exposed to the atmosphere.

Figure 9A:
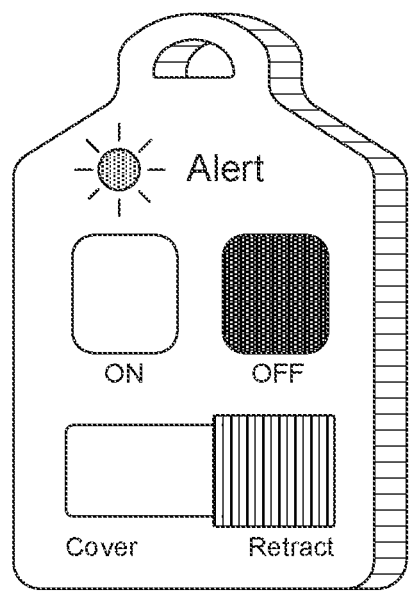
FIG. 9A illustrates an exemplary external device, according to some embodiments in the present disclosure.
Figure 9B:
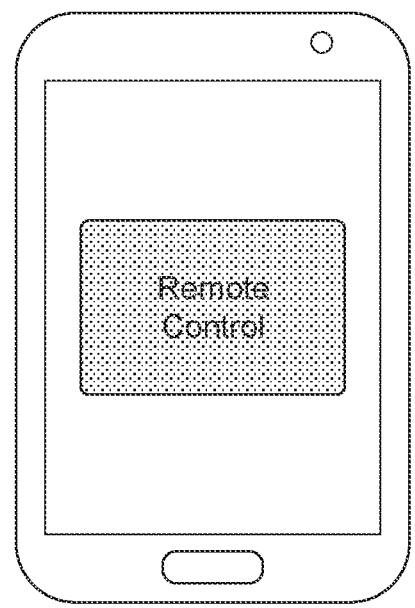
FIG. 9B illustrates an exemplary external device, according to some embodiments in the present disclosure.

Referring now to FIGS. 9A-B, an exemplary external device 950, 951 is illustrated. In some embodiments, the exemplary external device 950, 951 may control the use of the vehicle cover device, activating and deactivating, or storing, the cover when desired by the user. The exemplary external device 950 may comprise a small remote-controller that may only be used with the vehicle cover device. In some embodiments, the vehicle cover device may comprise a wireless controller that may allow for wireless control of at least a portion of the vehicle cover device, such as the spooling mechanism, attachment mechanism, or cover, as non-limiting examples. A small remote-controller may comprise a secure connection to the vehicle cover device compared to a software application with software security vulnerabilities.

In some implementations, the exemplary external device 950 may comprise a multi-purpose remote-controller that may be calibrated to work with a wireless controller of the vehicle cover device via signal transmission, such as through Bluetooth. In some aspects, the external device 951 may comprise a software application, compatible with iPhone or Android, as non-limiting examples.

Figure 10A:
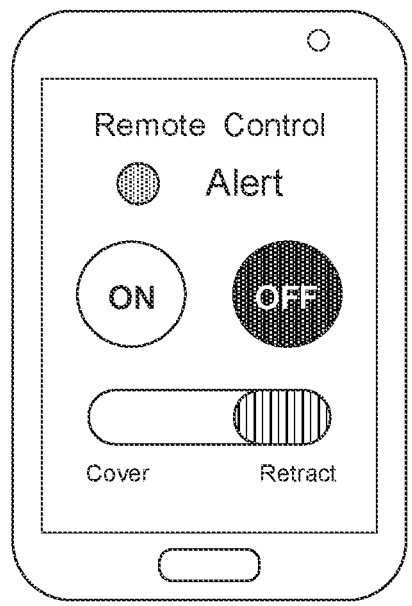
FIG. 10A illustrates an exemplary user interface, according to some embodiments in the present disclosure.
Figure 10B:
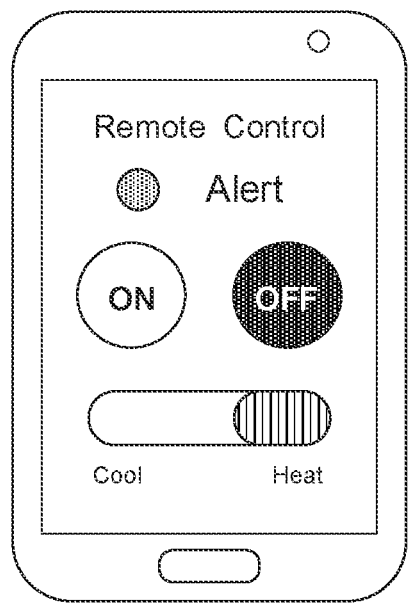
FIG. 10B illustrates an exemplary user interface, according to some embodiments in the present disclosure.
Figure 10C:
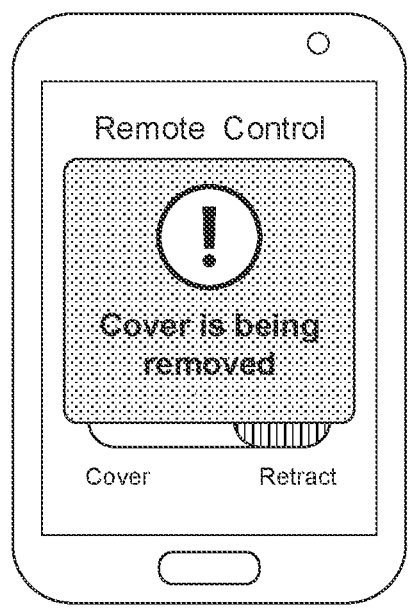
FIG. 10C illustrates an exemplary user interface, according to some embodiments in the present disclosure.

Referring now to FIGS. 10A-C, an exemplary user interface 1060, 1061, 1062 is illustrated. In various aspects, the exemplary user interface 1060, 1061, 1062 may comprise a software application. The exemplary user interface 1060 may deploy and retract the cover, controlling when the cover is in use and stored by the user. The exemplary user interface 1061 may control the temperature of the cover if the cover includes temperature-regulating elements as described FIGS. 1 and 3. The exemplary user interface 1062 shows a possible alarm notification as described with FIG. 6.

Conclusion

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A vehicle cover device comprising:
a cover configured to fit over a vehicle;
a spooling mechanism configured to spool the cover;
a release mechanism comprising an opening for rotational deployment of the cover via the spooling mechanism;
an attachment mechanism configured to attach to a surface of the vehicle; and
a case configured to contain one or more the spooling mechanism, the release mechanism, the cover, and the attachment mechanism, wherein the release mechanism comprises at least one locking mechanism configured to alternate between a locked state and an unlocked state, wherein a lid of the case is movable between an open position and a closed position when the at least one locking mechanism is in the unlocked state, wherein the lid moves between the open position and the closed position by pivoting along a horizontal axis, wherein the cover is deployable and retractable when the lid is in the open position.

2. The vehicle cover device of claim 1, wherein the cover comprises electromagnetic inseams wired into an electromagnetic circuit.

3. The vehicle cover device of claim 1, wherein the cover comprises a weighted base hem.

4. The vehicle cover device of claim 1, wherein the attachment mechanism comprises an alignment indicator for centering the vehicle cover device on the vehicle for deployment, wherein the alignment indicator comprises at least one electrical component.

5. The vehicle cover device of claim 1, wherein the cover comprises an alarm, wherein the alarm is configured to notify a user when a physical connection between the vehicle and the cover is severed.

6. The vehicle cover device of claim 1, wherein the case completely encloses the vehicle cover device.

7. The vehicle cover device of claim 1, wherein the attachment mechanism extends beyond at least a portion of windows of the vehicle, wherein the portion of windows secures the attachment mechanism to the vehicle when the portion of windows are in a closed position.

8. The vehicle cover device of claim 1, wherein the spooling mechanism is reversible, wherein reversing the spooling mechanism retracts the cover.

9. The vehicle cover device of claim 1, wherein deployment of one or both the release mechanism and the spooling mechanism is mechanical.

10. The vehicle cover device of claim 1, wherein the attachment mechanism comprises a magnetic portion configured to attach to the vehicle.

11. The vehicle cover device of claim 1, wherein deployment of one or both the release mechanism and the spooling mechanism is electronic.

12. The vehicle cover device of claim 11, further comprising a wireless controller, wherein activation of the vehicle cover device is received through the wireless controller from an external device.

13. The vehicle cover device of claim 12, wherein the external device comprises a software application with a plurality of user interfaces to control one or more the release mechanism, the cover, the spooling mechanism, the attachment mechanism, or the case.

14. The vehicle cover device of claim 12, wherein the external device comprises a remote controller.

15. The vehicle cover device of claim 1, further comprising a handle attached to the case, wherein the handle is configured to accept a hand of a user.

16. The vehicle cover device of claim 15, wherein one or both deployment and retraction of the cover is manual, and wherein the handle controls the spooling mechanism.

17. The vehicle cover device of claim 15, wherein the handle is configured to release the attachment mechanism.

18. The vehicle cover device of claim 17, wherein the attachment mechanism comprises suction cups.

19. The vehicle cover device of claim 1, wherein the at least one locking mechanism comprises one of: a torsion lock, a magnetic lock, and a physical lock.

20. The vehicle cover device of claim 13, wherein the cover comprises at least one thermoregulator element configuration to be controlled by at least one user interface of the plurality of user interfaces of the software application, wherein controlling the at least one thermoregulator element also controls a temperature of the vehicle.

\* \* \* \* \*